United States Patent [19]
Hashimoto

[11] Patent Number: 5,867,797
[45] Date of Patent: Feb. 2, 1999

[54] PORTABLE TELEPHONE SET HAVING A POWER CONTROLLER CAUSING A CURRENT CHARGING OF A BATTERY TO BE HELD CONSTANT

[75] Inventor: Kazuya Hashimoto, Tokyo, Japan

[73] Assignee: NEC Corporation, Tokyo, Japan

[21] Appl. No.: 579,343

[22] Filed: Dec. 27, 1995

[30] Foreign Application Priority Data

Dec. 27, 1994 [JP] Japan ................................ 6-326231

[51] Int. Cl.⁶ .............................................. H04Q 7/20
[52] U.S. Cl. ...................... 455/572; 455/89; 455/127; 320/15; 320/22; 320/31; 320/64; 358/406
[58] Field of Search ..................... 379/58, 61; 320/22, 320/31, 64, 15, 21; 455/572, 127, 89; 358/406

[56] References Cited

U.S. PATENT DOCUMENTS

| | | | |
|---|---|---|---|
| 4,910,761 | 3/1990 | Shimura et al. | 379/61 |
| 4,920,557 | 4/1990 | Umemoto | 455/127 |
| 4,933,963 | 6/1990 | Sato et al. | 455/127 |
| 4,939,770 | 7/1990 | Makino | 379/61 |
| 4,979,205 | 12/1990 | Haraguchi et al. | 379/61 |
| 4,998,291 | 3/1991 | Mauri et al. | 455/89 |
| 5,013,992 | 5/1991 | Eavenson et al. | 320/31 |
| 5,142,563 | 8/1992 | Nyuu et al. | 379/61 |
| 5,148,470 | 9/1992 | Kobayashi et al. | 379/58 |
| 5,182,655 | 1/1993 | Motoyanagi | 358/406 |
| 5,289,102 | 2/1994 | Toya | 320/22 |
| 5,479,486 | 12/1995 | Saji | 320/64 |
| 5,481,593 | 1/1996 | Nakayama | 379/61 |
| 5,623,194 | 4/1997 | Boll et al. | 320/15 |

FOREIGN PATENT DOCUMENTS 3-30262  2/1991  Japan .

Primary Examiner—William Cumming
Attorney, Agent, or Firm—Young & Thompson

[57] ABSTRACT

A portable telephone set has a power supply in which a secondary cell is employed. A charging detector for detecting whether a charger for charging the secondary cell is connected to the power supply, wherein the charging detector generates a detection signal when it detects that the charger is connected to the power supply. A power controller turns on power of the portable telephone set when it receives the detection signal from the charging detector.

2 Claims, 3 Drawing Sheets

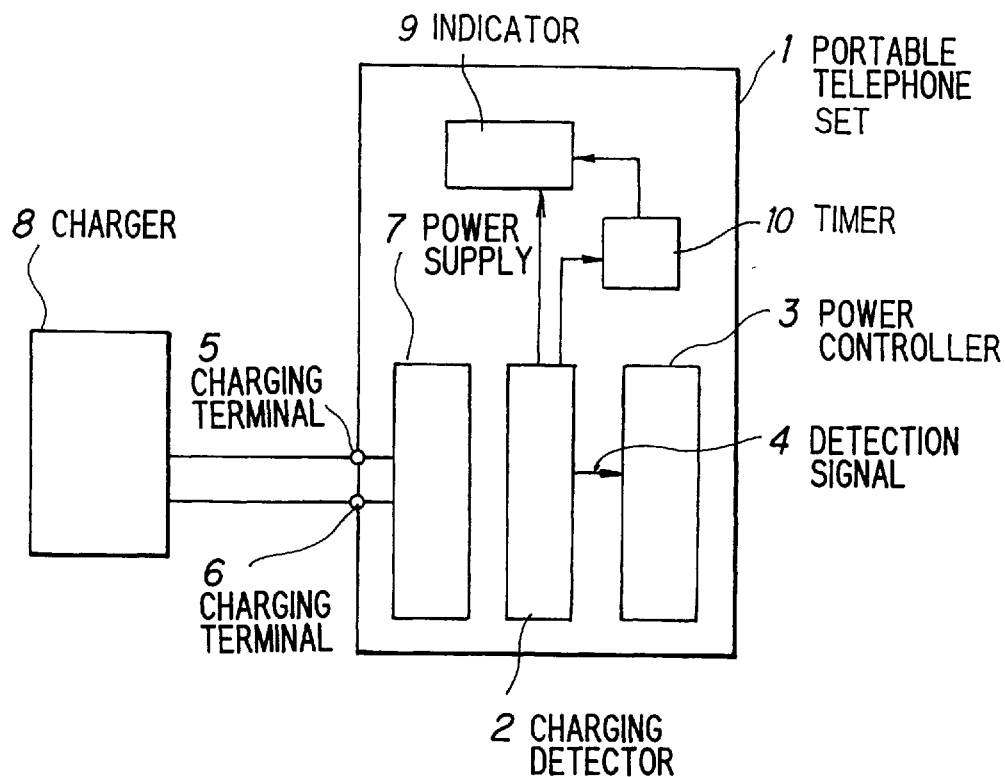
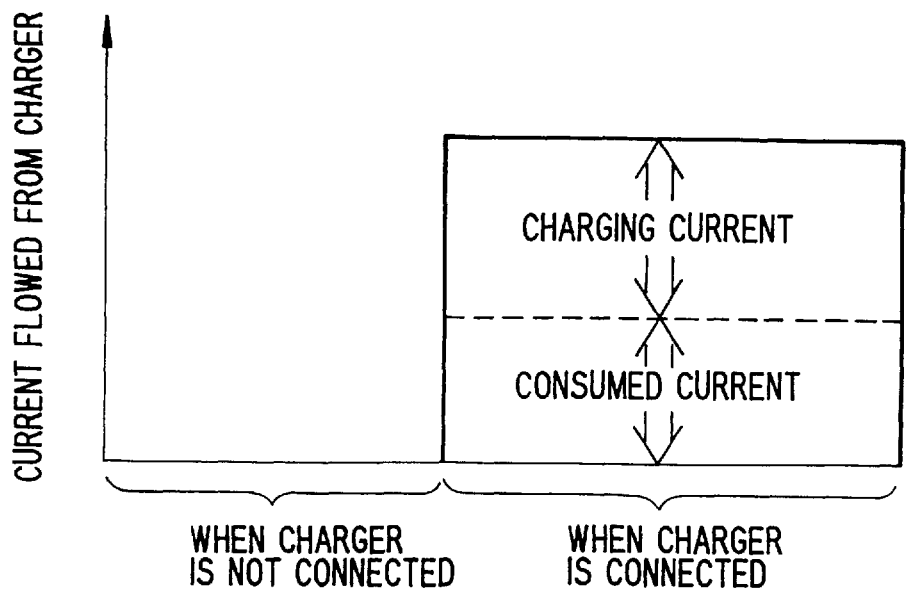

PORTABLE TELEPHONE SET HAVING A POWER CONTROLLER CAUSING A CURRENT CHARGING OF A BATTERY TO BE HELD CONSTANT

FIELD OF THE INVENTION

This invention relates to a portable telephone set in which a secondary cell is employed.

BACKGROUND OF THE INVENTION

A conventional portable telephone set comprises a power supply in which a secondary cell is employed and a power controller for controlling power consumed by the telephone. The power supply can be connected with a charger through charging terminals to charge current into the secondary cell. When the power supply is connected to the charger, a constant current (charging current) flows into the telephone from the charger, regardless of whether the power of the telephone is turned ON or OFF.

For example, Japanese patent application laid-open No. 3-30262 discloses a charger of a portable telephone set which can function as both a charger and an external power supply to omit a part of a power supply circuit and a circuit-changing switch in the telephone set.

However, in the conventional telephone, if the level of the charging current is set to match the current drawn by the telephone set when it is turned ON, the charging current may exceed a maximum value and overcharge the cell when the telephone is turned OFF.

On the contrary, if the level of the charging current is set to correspond to the current drawn by the telephone set when it is turned OFF, the charging current may be below the required minimum current value required for charging when the telephone is turned ON.

SUMMARY OF THE INVENTION

Accordingly, it is an object of the invention to provide a portable telephone set in which charging can be stably carried out regardless of whether the telephone is ON or OFF.

According to the invention, a portable telephone set, comprises:

a power supply in which a battery is employed;

a charging detector for detecting whether a charger for charging current into the battery is connected to the power supply, wherein the charging detector generates a detection signal when it detects that the charger is connected to the power supply; and a power controller which turns on power to the portable telephone set when it receives the detection signal from the charging detector.

In the portable telephone set of the invention, the power of the portable telephone set can be always turned ON when the charger is connected thereto, thereby keeping the charging current flowing from the charger at a constant value as previously known. Additionally, since the power is always turned ON when the charging situation is detected by the charging detector, an operator can confirm the charging situation through an indicator such as an LCD or LED, which is simultaneously turned on.

Furthermore, the indicator may also inform the charging time measured by a means for measuring a period when the detection signal is output, for example, a timer.

BRIEF DESCRIPTION OF THE DRAWINGS

The invention will be explained in more detail in conjunction with the appended drawings, wherein:

FIG. 3 is a block diagram showing a portable telephone set in a first preferred embodiment according to the invention, FIG. 4 is a graph showing a relation between current supplied from a charger under power ON and power OFF conditions for the portable telephone set in FIG. 3.

DESCRIPTION OF THE PREFERRED EMBODIMENTS

Before explaining a portable telephone set in the preferred embodiment, the aforementioned conventional portable telephone set will be explained in FIG. 1.

Figure 1:
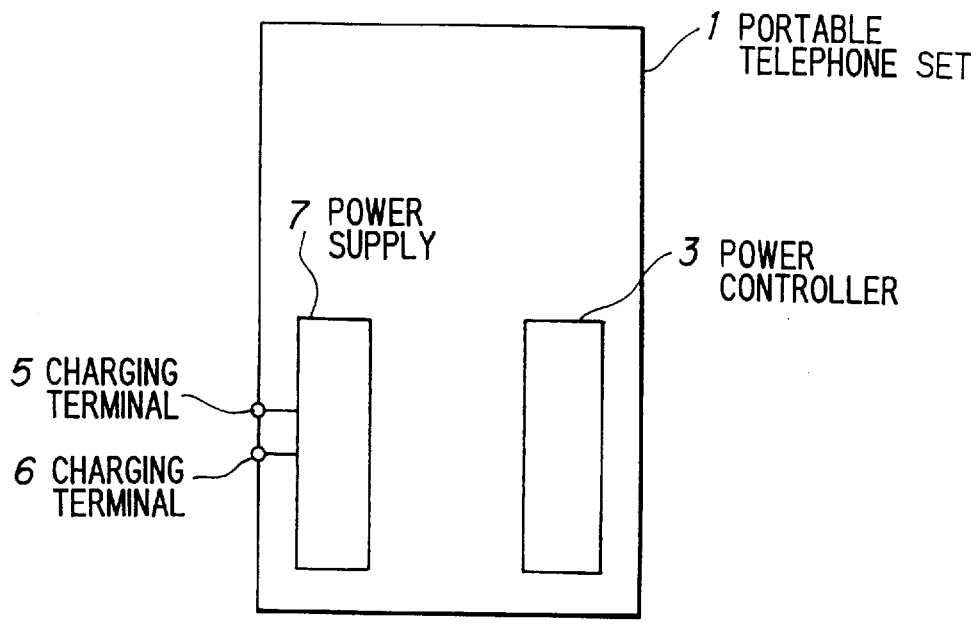
FIG. 1 is a block diagram showing a conventional portable telephone set.

FIG. 1 shows a conventional portable telephone set which comprises a telephone set 1 including a power controller 3 and a power supply 7 in which a battery is employed. The power supply 7 can be connected to a charger through charging terminals 5, 6. In operation, when the telephone set 1 is connected to the charger, current is supplied from the charger through the power supply 7 to the telephone set 1 irrespective of whether the power is ON or OFF. If the power is OFF at the time of connection therebetween, the charging current flowed from the charger is mostly used to charge the power supply 7. On the other hand, if the power is ON at the time of connection therebetween, the charging current from the charger is divided into current consumed by the telephone set 1 and current used to charge the power supply 7 through the power supply 7. Therefore, regardless of whether the telephone set 1 is ON or OFF, a constant current (charging current) is supplied to the telephone set 1.

Figure 2:
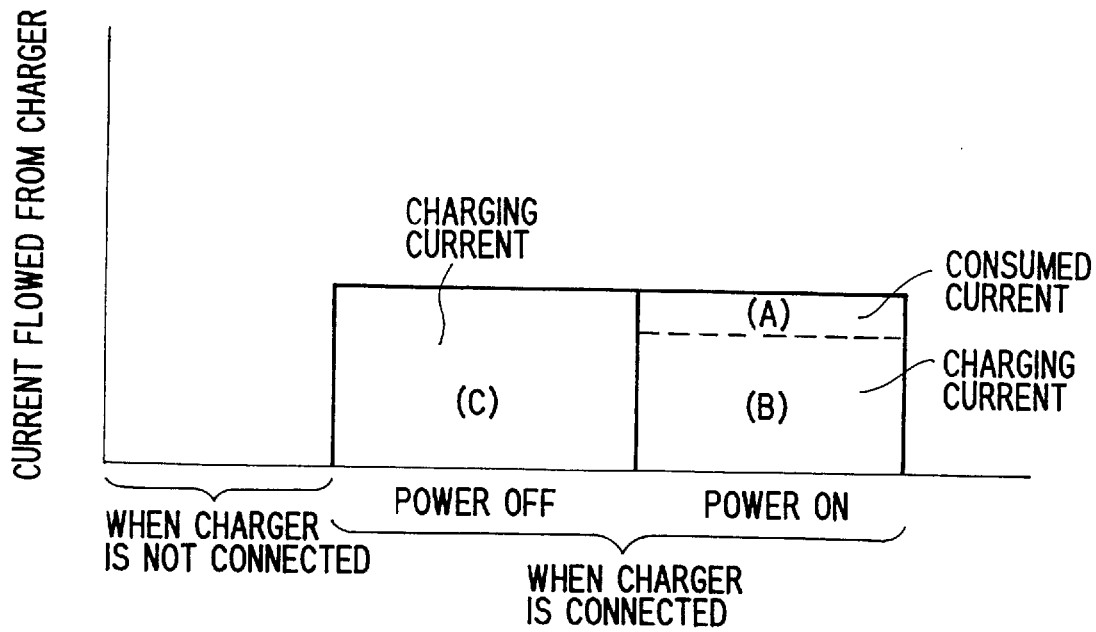
FIG. 2 is a graph showing a relation between current supplied from a charger under power ON and power OFF conditions in a conventional portable telephone set.

Accordingly, if the level of charging current supplied from the charger is, as shown in FIG. 2, set to correspond to that of the telephone set while powered ON, the charging current supplied under power OFF conditions may be excessive and may reduce the performance of the power supply. In FIG. 2, (A) indicates current consumed by the portable telephone set, and (B) and (C) indicate charging current. Herein, the relation of (B)<(C) is established.

Next, a portable telephone set in a first preferred embodiment will be explained in FIG. 3, wherein like parts are indicated by like reference numerals as used in FIG. 1.

The portable telephone set in the first embodiment comprises a telephone set 1, a power supply 7 in which a battery is employed, a charging detector 2 which detects that an external charger 8 is connected to the power supply 7 of the telephone set 1 and then generates a detection signal 4, a power controller 3 which receives the detection signal 4 to control the power of the telephone set 1, an indicator 9 for indicating that the detection signal 4 is active and a timer 10 for measuring the time period during which the detection signal 4 indicates that the battery is being charged.

In this embodiment, the power controller 3 always turns ON the power of the telephone set 1 when the charger 8 is connected to the power supply 7, whereby the charging current received from the charger 8 is kept at a constant value as previously designed.

The indicator 9 may be an LED (light emitting diode), LCD (liquid crystal display) or the like. The time period measured by the timer 10 can be displayed by the indicator 9 to indicate the duration of actual charging.

In operation, when the power supply 7 of telephone set 1 is connected with the charger 8 through charging terminals 5 and 6, the charging detector 2 detects the charging situation and generates the detection signal 4 to the power controller 3. Then the power controller 3 turns ON the power of the telephone set 1. Therefore, the telephone set 1 is always turned ON during charging.

The current passed from the charger 8 into the telephone body 1 is, as shown in FIG. 4, composed of charging current and current consumed by the telephone 1. In FIG. 4, the vertical axis indicates current from the charger 8, and the horizontal axis indicates the conditions of the charger 8 not connected to the telephone set 1 and the charger 8 connected to the telephone set 1. Namely, the amount of the current flowed from the charger 8 into the telephone set 1 is a summation of "charging current required in the charging of the cell" and "current consumed by the telephone". Therefore, the failure in charging and overcharging can be avoided by supplying such constant amount of current.

Herein, for example, the consumed current is about 400 mA during a call (30 mA while waiting for a call), and the charging current is about 400 mA.

Figure 5:
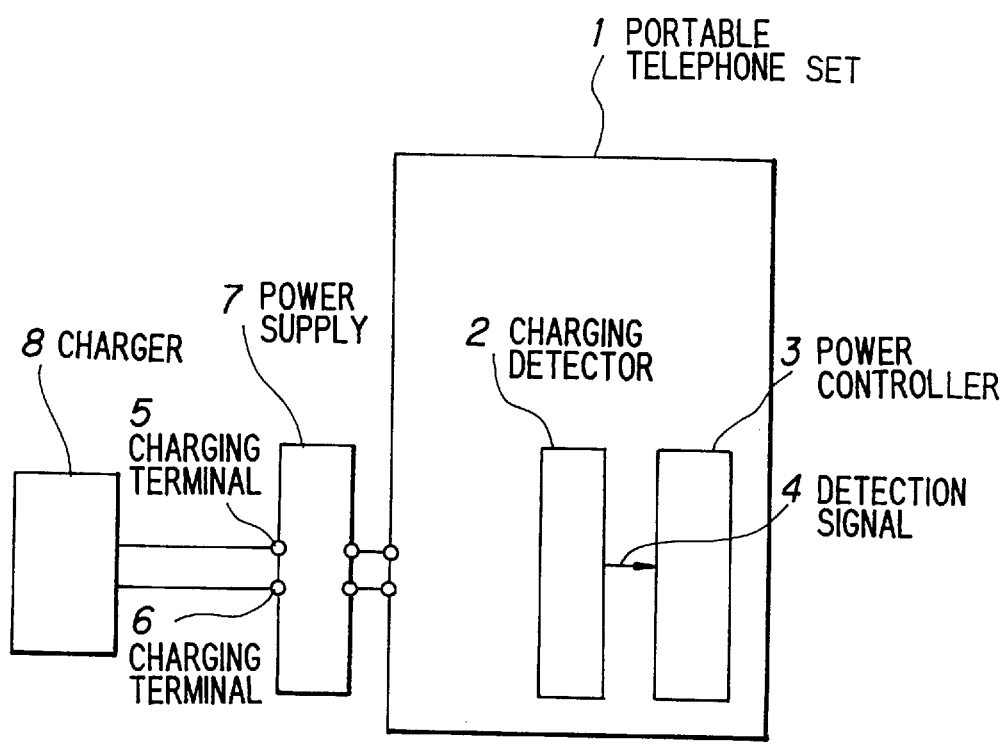
FIG. 5 is a block diagram showing a portable telephone set in a second preferred embodiment according to the invention.

FIG. 5 shows a portable telephone set in a second preferred embodiment according to the invention, in which a power supply 7 is separated from a portable telephone set body 1 which comprises a charging detector 2 and a power controller 3. The power supply 7 is positioned out of the telephone set 1 and is connected to the telephone set through lines. The power supply 7 is provided with charging terminals 5 and 6 for connecting to a charger 8.

In the above portable telephone set, the charging detector 2 in the telephone set 1 detects the connection with the charger 8, and the power controller 3 always turns ON the power of the telephone set 1 when connected with the charger 8, regardless of whether the power is ON or OFF just before then.

In the above embodiments, the detection as to whether or not the charger 8 is actually connected to the power supply 7 can be, for example, performed by detecting a voltage generated at the charging terminal 5 or 6. Herein, to prevent an operation error, the detection signal may be generated only when the detected voltage exceeds a predetermined value. For example, the voltage generated at the terminal 5 or 6 can be detected in such a way that one terminal of a general-purpose comparator is connected with the charging terminal 5 or 6 and the other terminal thereof is connected to a reference voltage to measure a voltage difference therebetween.

Although the invention has been described with respect to specific embodiment for complete and clear disclosure, the appended claims are not to be thus limited but are to be construed as embodying all modification and alternative constructions that may be known to one skilled in the art which fairly fall within the basic teaching herein set forth.

What is claimed is:

1. A portable telephone set, comprising;
   a power supply in which a battery is employed;
   a charging detector for detecting whether a charger for charging current into said battery is connected to said power supply, wherein said charging detector generates a detection signal when it detects that said charger is connected to said power supply;
   a power controller which turns on power of said portable telephone set when said power controller receives said detection signal from said charging detector, said power controller thereby causing said current charging said battery to be held constant at a predetermined value;
   means for indicating a charging condition, wherein said indicating means operates when said detection signal is generated; and
   means for measuring a time period during which said detection signal is generated, wherein said indicating means displays said time period;
   wherein said charging detector comprises means for detecting whether said charger is connected to said power supply, wherein said detecting means detects a voltage generated on a terminal of said power supply when said charger is connected to said power supply;
   wherein said detecting means detects a voltage difference between said voltage generated on said terminal and a reference voltage, said detecting means generating said detecting signal when detecting said voltage difference; and
   wherein said detecting means generates aid detection signal when said voltage difference exceeds a predetermined value.

2. A portable telephone set, according claim 1, wherein:
   said power supply is external to said portable telephone set.

* * * * *